(12) United States Patent
Tanizaki (10) Patent No.: US 8,543,293 B2
(45) Date of Patent: Sep. 24, 2013

(54) ROUTE GUIDANCE APPARATUS, ROUTE GUIDANCE METHOD, AND COMPUTER PROGRAM

(75) Inventor: Daisuke Tanizaki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/311,088

(22) Filed: Dec. 5, 2011

(65) Prior Publication Data

US 2012/0158284 A1    Jun. 21, 2012

(30) Foreign Application Priority Data

Dec. 21, 2010   (JP) ................................. 2010-284144

(51) Int. Cl.
*B62D 12/00*    (2006.01)

(52) U.S. Cl.
USPC ............. 701/41; 701/410; 701/418; 701/428; 701/430; 701/431; 701/432; 701/437; 701/440; 701/442; 701/443; 340/901; 340/933; 340/990; 340/993; 340/995.1

(58) Field of Classification Search
USPC .................... 701/23, 410, 418, 428, 430, 431, 701/432, 437, 440, 442, 443, 446, 453, 454, 701/455, 457, 461, 468, 532, 533; 340/901, 340/933, 990, 993, 998, 995.1, 995.2, 995.17, 340/995.19, 995.21, 995.25, 995.27
See application file for complete search history.

(56) References Cited

FOREIGN PATENT DOCUMENTS

JP    A 2005-147697    6/2005

*Primary Examiner* — McDieunel Marc
(74) *Attorney, Agent, or Firm* — Oliff & Berridge, PLC (57) ABSTRACT

Route guidance apparatuses, methods, and programs determine a guidance intersection in front of a movable body in a direction of travel along a navigation route. The apparatuses, methods, and programs acquire a shape of the guidance intersection, determine an exit road on which the movable body leaves the guidance intersection, and determine whether the determined exit road is one of a plurality of roads connected to the guidance intersection that exist in an area extending in the same direction as the determined exit road. When the determined road is one of the plurality of roads that exist in the area extending in the same direction as the exit road, the apparatuses, methods, and programs associate each of the plurality of roads with an identification information item usable to identify a connecting relationship with the guidance intersection, and provide guidance using the identification information item associated with the exit road.

17 Claims, 8 Drawing Sheets

WHEN NO FOLLOWING ROAD EXISTS

FIG. 5

WHEN NO FOLLOING ROAD EXISTS (RIGHT TURN)

ANGLE WITH RESPECT TO ACCESS ROAD

◨ : DIAGONALLY RIGHT

▦ : RIGHT

▩ : BACKWARD TO RIGHT

FIG. 6

WHEN NO FOLLOWING ROAD EXISTS

FIG. 7

WHEN FOLLOWING ROAD EXISTS

WHEN THREE OBJECT ROADS EXIST
(WHILE NO FOLLOWING ROAD EXISTS)

FIG. 12

WHEN FEATURE EXISTS AT PERIPHERY
OF GUIDANCE INTERSECTION

ROUTE GUIDANCE APPARATUS, ROUTE GUIDANCE METHOD, AND COMPUTER PROGRAM

INCORPORATION BY REFERENCE

The disclosure of Japanese Patent Application No. 2010-284144, filed on Dec. 21, 2010, including the specification, drawings, and abstract is incorporated herein by reference in its entirety.

BACKGROUND

1. Related Technical Fields

Related technical fields include guidance apparatuses, route guidance methods, and computer programs for guiding movable bodies along navigation routes.

2. Related Art

Recently, navigation systems that provide driving guidance for vehicles have been installed in many vehicles so that the drivers can easily reach desired destinations. The navigation systems herein refer to devices capable of detecting the current positions of the vehicles in which the navigation systems are installed using, for example, GPS receivers, capable of acquiring map data corresponding to the current positions via recording media such as DVD-ROMs and HDDs or via networks, and capable of displaying the map data on liquid crystal monitors. Such a navigation system has a route search function of searching for an optimum route from a place of departure to a destination on the basis of a desired destination input by a user. The navigation system displays a navigation route set on the basis of the search results on a display screen, and provides the user with guidance using voice and the display screen when the vehicle approaches an intersection at which the user is to be instructed to, for example, turn right or left (hereinafter referred to as "guidance intersection") so as to guide the user to the desired destination without fail. Recently, some devices such as cellular phones, personal digital assistants (PDAs), and personal computers have also been provided with functions similar to those of the navigation system, and are capable of providing guidance described as above for pedestrians and two-wheeled vehicles in addition to the vehicles.

When the user is instructed to turn right or left at the guidance intersection, it is important for the user to correctly determine a road for which the vehicle leaves the guidance intersection (that is, a road from which the user enters the guidance intersection) among a plurality of roads connected to the guidance intersection. However, when the guidance intersection has a complicated shape such as that of a junction of five roads, it is difficult for the user to determine the road for which the vehicle leaves the guidance intersection on the basis of the guidance. To solve this, Japanese Patent Application Publication No. JP-A-2005-147697 (in pages 7 and 8 and FIGS. 5 and 6), for example, describes a technology of guiding a user using voice guidance messages selected by the user. In this technology, when the vehicle approaches a guidance intersection having a complicated shape, the user is required to select a voice guidance message from a list of voice guidance messages to be provided at the guidance intersection displayed on a display screen. After this, the user is guided using the voice guidance message selected by the user each time the vehicle approaches the same guidance intersection.

The technology described in JP-A-2005-147697 allows the user to determine the road for which the vehicle leaves the guidance intersection that the vehicle has passed before on the basis of the guidance. However, the technology cannot be applied if the vehicle has never passed the guidance intersection. In addition, selection of a voice guidance message required each time the vehicle passes a guidance intersection having a complicated shape is burdensome on the user during driving.

SUMMARY

Exemplary implementations of the broad inventive principles described herein provide a route guidance apparatus, a route guidance method, and a computer program capable of making a user correctly determine a road for which a movable body leaves a guidance intersection without imposing extra operations on the user.

Exemplary implementations provide a route guidance apparatus that includes a navigation route setting unit that sets a navigation route along which a movable body is guided; a movable body position acquiring unit that acquires a position of the movable body; a guidance intersection determining unit that determines a guidance intersection in front of the movable body in a direction of travel on the basis of the navigation route and the position of the movable body; an intersection shape acquiring unit that acquires a shape of the guidance intersection; a road determining unit that determines whether or not a plurality of roads connected to the guidance intersection exist in an area extending in the same direction as an exit road for which the movable body leaves the guidance intersection on the basis of the navigation route and the shape of the guidance intersection acquired by the intersection shape acquiring unit; an identification-information associating unit that, when the road determining unit determines that the plurality of roads connected to the guidance intersection exist in the area extending in the same direction as the exit road, associates each road with an identification information item used to identify a connecting direction along which the road is connected to the guidance intersection; and an intersection guiding unit that provides guidance on the guidance intersection using the identification information item associated with the exit road.

According to exemplary implementations, the "movable body" includes pedestrians and two-wheeled vehicles in addition to vehicles.

According to exemplary implementations, the "guidance intersection" corresponds to an intersection at which the route guidance apparatus instructs the movable body to, for example, turn left or right while the route guidance apparatus guides the movable body along the navigation route.

According to exemplary implementations, the road determining unit may determine whether or not the plurality of roads connected to the guidance intersection exist in the area extending in the same direction as the exit road with respect to a direction of an access road from which the movable body enters the guidance intersection.

According to exemplary implementations, the route guidance apparatus may further include a following-road determining unit that determines whether or not a following road that smoothly follows an access road from which the movable body enters the guidance intersection is connected to the guidance intersection on the basis of the navigation route and the shape of the guidance intersection acquired by the intersection shape acquiring unit. When the following-road determining unit determines that the following road is connected to the guidance intersection, the identification-information associating unit may associate each road with the identification information item on the basis of the positional relationship of the road with the following road.

According to exemplary implementations, when the following-road determining unit determines that no following road is connected to the guidance intersection, the identification-information associating unit may associate each road with the identification information item on the basis of the positional relationship of the road with the access road.

According to exemplary implementations, the route guidance apparatus may further include a feature-information acquiring unit that, when a feature exists at a periphery of the guidance intersection, acquires feature information relating to the feature. The identification-information associating unit associates each road with the identification information item on the basis of the positional relationship of the road with the feature.

Exemplary implementations provide a route guidance method that includes a navigation route setting step of setting a navigation route along which a movable body is guided; a movable body position acquiring step of acquiring a position of the movable body; a guidance intersection determining step of determining a guidance intersection in front of the movable body in a direction of travel on the basis of the navigation route and the position of the movable body; a shape acquiring step of acquiring a shape of the guidance intersection; a road determining step of determining whether or not a plurality of roads connected to the guidance intersection exist in an area extending in the same direction as an exit road for which the movable body leaves the guidance intersection on the basis of the navigation route and the shape of the guidance intersection acquired in the shape acquiring step; an identification-information associating step of associating each road with an identification information item used to identify a connecting direction along which the road is connected to the guidance intersection when it is determined that the plurality of roads connected to the guidance intersection exist in the area extending in the same direction as the exit road in the road determining step; and an intersection guiding step of providing guidance on the guidance intersection using the identification information item associated with the exit road.

Exemplary implementations provide a computer program installed in a computer that causes a processor to perform a navigation route setting function of setting a navigation route along which a movable body is guided, a movable body position acquiring function of acquiring a position of the movable body, a guidance intersection determining function of determining a guidance intersection in front of the movable body in a direction of travel on the basis of the navigation route and the position of the movable body, an intersection shape acquiring function of acquiring a shape of the guidance intersection, a road determining function of determining whether or not a plurality of roads connected to the guidance intersection exist in an area extending in the same direction as an exit road for which the movable body leaves the guidance intersection on the basis of the navigation route and the shape of the guidance intersection acquired using the intersection shape acquiring function, an identification-information associating function of associating each road with an identification information item used to identify a connecting direction along which the road is connected to the guidance intersection when it is determined that the plurality of roads connected to the guidance intersection exist in the area extending in the same direction as the exit road using the road determining function, and an intersection guiding function of providing guidance on the guidance intersection using the identification information item associated with the exit road.

According to exemplary implementations, a user can correctly determine the exit road to which the movable body is to advance from a guidance intersection even when the plurality of roads connected to the guidance intersection exist in an area extending in the same direction as the exit road for which the movable body leaves the guidance intersection. In addition, the user can correctly determine the exit road without extra operations.

According to exemplary implementations, each road is associated with the identification information item used to identify the connecting direction along which the road is connected to the guidance intersection when it is determined that the plurality of roads connected to the guidance intersection exist in an area extending in the same direction as the exit road with respect to the direction of the access road from which the movable body enters the guidance intersection. Therefore, roads that are not easily identified by the user, in particular, can be associated with the identification information items.

According to exemplary implementations, when the following road that smoothly follows the access road is connected to the guidance intersection, each road is associated with the identification information item on the basis of the positional relationship of the road with the following road. Therefore, the plurality of roads existing in the area extending in the same direction can be relatively identified with respect to the following road. This allows the user to determine the exit road to which the movable body is to advance from the guidance intersection more correctly.

According to exemplary implementations, when no following road that smoothly follows the access road is connected to the guidance intersection, each road is associated with the identification information item on the basis of the positional relationship of the road with the access road. Therefore, the plurality of roads existing in the area extending in the same direction can be relatively identified with respect to the access road. This allows the user to correctly determine the exit road to which the movable body is to advance from the guidance intersection even when no following road exists.

According to exemplary implementations, when the feature exists at the periphery of the guidance intersection, each road is associated with the identification information item on the basis of the positional relationship of the road with the feature. Therefore, the plurality of roads in the area extending in the same direction can be relatively identified with respect to the feature. This allows the user to determine the exit road to which the movable body is to advance from the guidance intersection more correctly.

DETAILED DESCRIPTION OF EXEMPLARY IMPLEMENTATIONS

Figure 1:
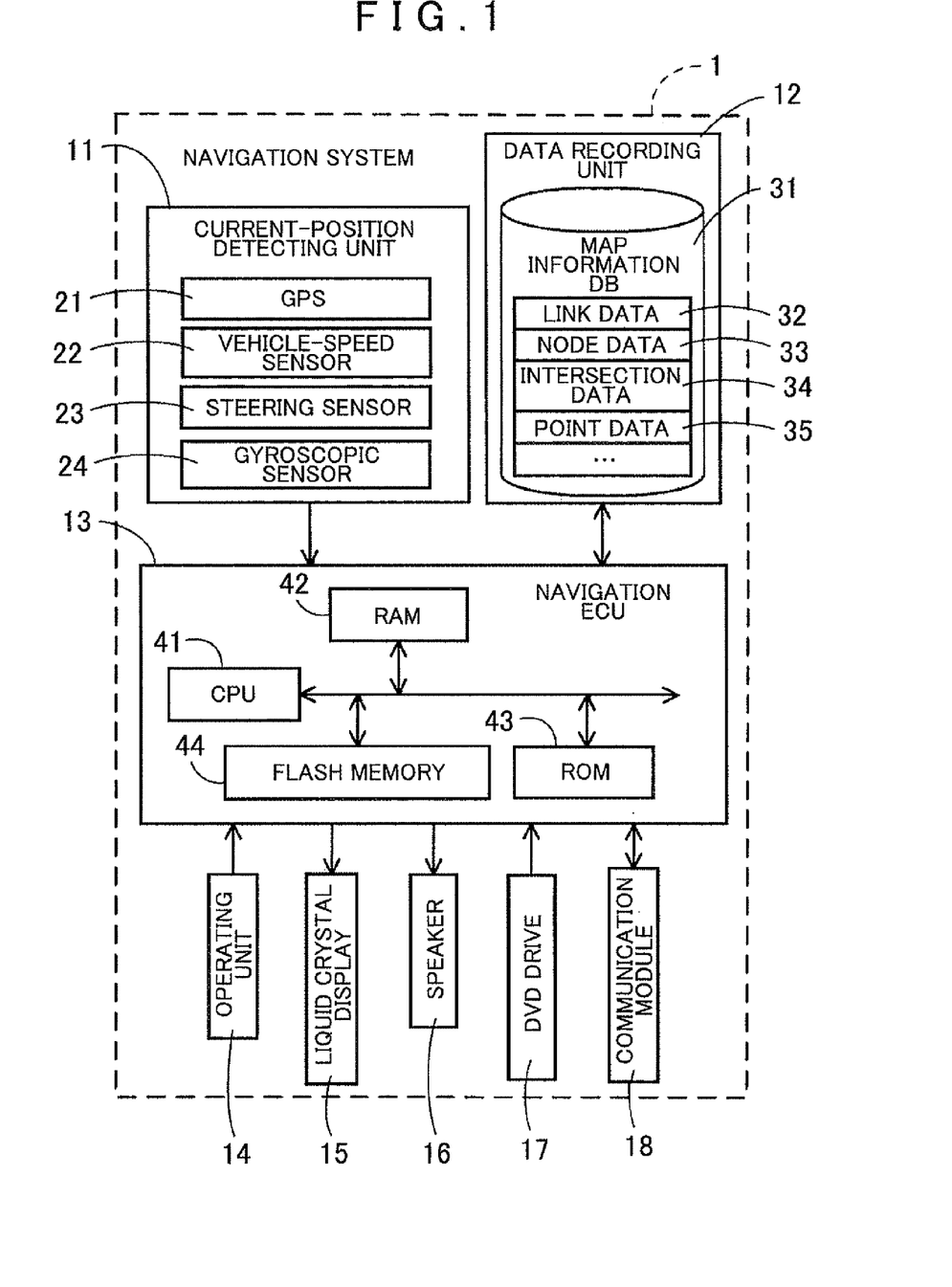
FIG. 1 is a block diagram of a navigation system according to an example.

A route guidance apparatus will now be described in detail with reference to the drawings. First, a schematic structure of a navigation system 1 according to this example will be described with reference to FIG. 1. FIG. 1 is a block diagram of the navigation system 1 according to this example.

As shown in FIG. 1, the navigation system 1 according to this example includes a current-position detecting unit 11 that detects the current position of a vehicle on which the navigation system 1 is mounted, a data recording unit 12 in which various data is recorded, a controller (e.g., navigation electronic control unit (ECU) 13) that performs various computations on the basis of input information, an operating unit 14 that receives operations from users, a liquid crystal display 15 that displays maps at the periphery of the vehicle and information relating to facilities for the users, a speaker 16 that outputs voice guidance on navigation routes, a DVD drive 17 that reads DVDs serving as storage media, and a communication module 18 that communicates with information centers such as probe centers and the Vehicle Information and Communication System (VICS; registered trademark in Japan) center.

Components that constitute the navigation system 1 will now be described in sequence.

The current-position detecting unit 11 includes, for example, a GPS 21, a vehicle-speed sensor 22, a steering sensor 23, and a gyroscopic sensor 24, to detect the current position and the direction of the vehicle, and the travel speed of the vehicle, the current time, and other parameters. In particular, the vehicle-speed sensor 22 detects the moving distance and the vehicle speed of the vehicle, and generates pulses in accordance with the rotation of driving wheels of the vehicle to output pulse signals to the navigation ECU 13. The navigation ECU 13 counts the generated pulses to calculate the rotational speed of the driving wheels and the moving distance. The navigation system 1 does not need to include all the five sensors described above, and may include only one or more sensors among the five sensors.

The data recording unit 12 includes a hard disk (not shown) serving as an external storage device and a recording medium. The data recording unit 12 further includes a read-write head (not shown) serving as a driver for reading, for example, map information database (DB) 31 and predetermined programs recorded in the hard disk and for writing predetermined data into the hard disk. The data recording unit 12 may include optical disks such as memory cards, CDs, and DVDs instead of the hard disk.

The map information DB 31 is a storage unit that stores, for example, link data 32 relating to roads (links), node data 33 relating to nodes, intersection data 34 relating to intersections, point data 35 relating to points such as facilities, map display data for displaying maps, route search data for searching for routes, and point search data for searching for points.

The link data 32 includes, for example, link IDs used to identify the links, end node information used to determine nodes located at the ends of the links, and types and the numbers of traffic lanes of the roads that constitute the links. The node data 33 includes, for example, node IDs used to identify the nodes, the positional coordinates of the nodes, and target node information used to determine target nodes to which the nodes are connected via the links. The intersection data 34 includes, for example, relevant node information used to determine nodes that form the intersections, connected link information used to determine links connected to the intersections (hereinafter referred to as "connected links"), and connected-link direction information used to determine connecting directions along which the connected links are connected to the intersections. The point data 35 includes, for example, the names, the categories, and the positional coordinates of the points such as facilities.

The navigation ECU 13 determines guidance intersections that exist in front of the vehicle in the direction of travel on the basis of the data stored in the map information DB 31 as described below, and acquires the shapes of the guidance intersections and feature information relating to features located at the peripheries of the guidance intersections. The guidance intersections herein refer to intersections at which the navigation system 1 instructs a driver of the vehicle to, for example, turn left or right while the navigation system 1 guides the driver along a navigation route.

Figure 2:
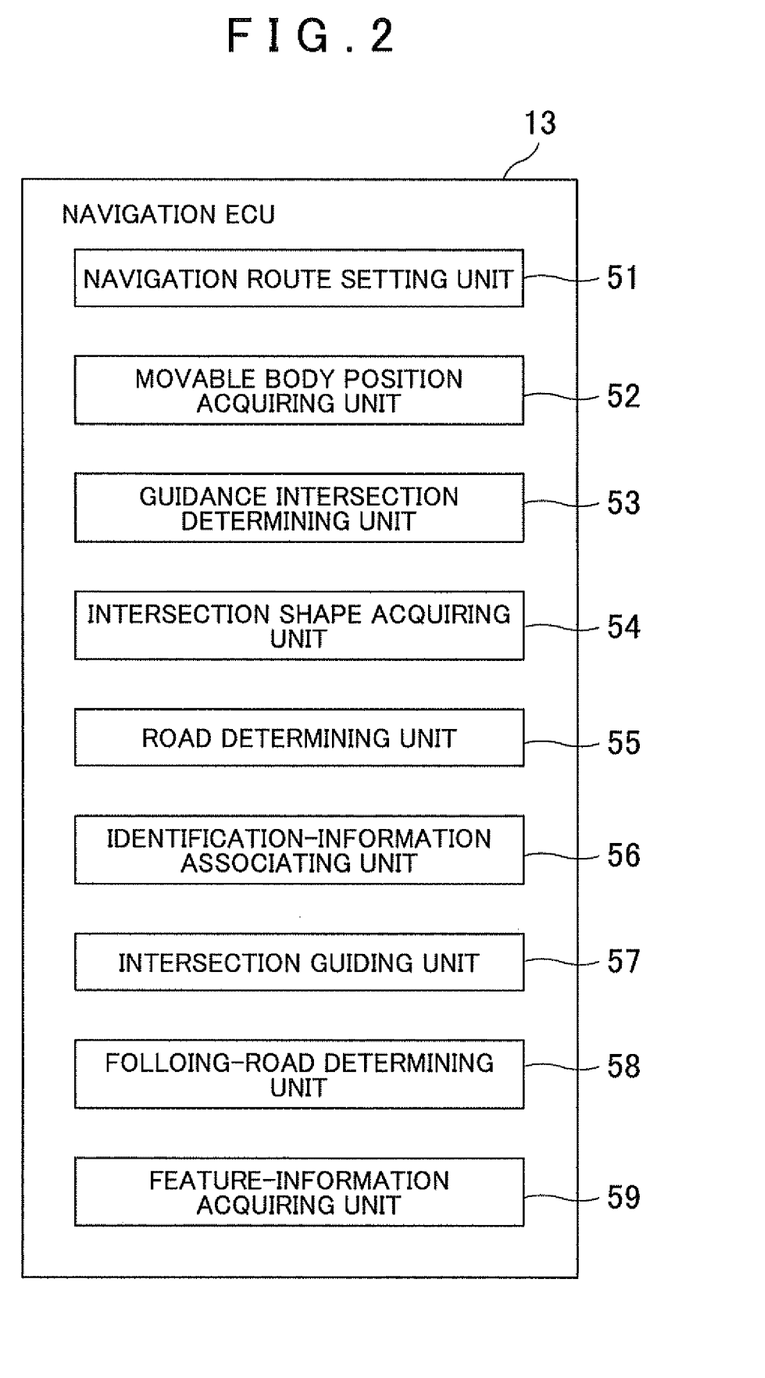
FIG. 2 illustrates various units included in a navigation ECU.

The navigation ECU 13 controls the entire navigation system 1. The navigation ECU 13 includes a CPU 41 that serves as a computing device and a control device and internal storage devices such as a RAM 42 that serves as a working memory used when the CPU 41 performs various computations and that stores data such as route data obtained when routes are searched for, a ROM 43 in which programs for control, an intersection guidance processing program (described below; see FIG. 3), and other programs are recorded, and a flash memory 44 that stores the programs read from the ROM 43. Herein, the navigation ECU 13 includes various units serving as processing algorithms as shown in FIG. 2. For example, a navigation route setting unit 51 sets a navigation route along which the vehicle (movable body) is guided. A movable body position acquiring unit 52 acquires the position of the vehicle. A guidance intersection determining unit 53 determines a guidance intersection in front of the vehicle in the direction of travel on the basis of the set navigation route and the position of the vehicle. An intersection shape acquiring unit 54 acquires the shape of the determined guidance intersection. A road determining unit 55 determines whether or not a plurality of roads connected to the guidance intersection exist in an area extending in the same direction as a road for which the vehicle leaves the guidance intersection (hereinafter referred to as "exit road") on the basis of the navigation route and the shape of the guidance intersection. An identification-information associating unit 56 associates each road with an identification information item used to identify a connecting direction along which the road is connected to the guidance intersection when the road determining unit determines that a plurality of roads connected to the guidance intersection exist in the area extending in the same direction as the exit road. An intersection guiding unit 57 provides guidance on the guidance intersection using the identification information item associated with the exit road. A following-road determining unit 58 determines whether or not a following road that smoothly follows an access road from which the vehicle enters the guidance intersection is connected to the guidance intersection on the basis of the navigation route and the shape of the guidance intersection. A feature-information acquiring unit 59 acquires, when features exist at the periphery of the guidance intersection, feature information relating to the features.

The operating unit 14 is operated when, for example, a user inputs a place of departure serving as a travel starting point and a destination serving as a travel end point, and includes operating switches (not shown) such as various keys and buttons. The navigation ECU 13 performs control such that various operations corresponding to switching signals output when, for example, the switches are pushed down are performed. The operating unit 14 may include a touch panel disposed on the front surface of the liquid crystal display 15. The operating unit 14 may further include a microphone and a voice recognition device.

The liquid crystal display 15 displays, for example, map images including roads, traffic information, operation guidance, operation menus, key guidance, a planned travel route from the place of departure to the destination, guidance information along the planned travel route, news, weather information, time, email, and television programs. In this example, when the vehicle reaches a point separated from the guidance intersection in front of the vehicle in the direction of travel by a predetermined distance (for example, 300 meters), the liquid crystal display 15 displays an enlarged view in the vicinity of the guidance intersection and directions of the vehicle at the guidance intersection.

The speaker 16 outputs guidance such as traffic information and voice guidance used to provide traveling guidance along the planned travel route on the basis of instructions issued from the navigation ECU 13. In this example, when the vehicle reaches points separated from the guidance intersection in front of the vehicle in the direction of travel by predetermined distances (for example, 700 and 300 meters), the speaker 16 outputs voice guidance prepared in view of the shape of the guidance intersection and features at the periphery thereof (for example, "turn right into the farthest road soon" and "turn right into a road in front of XXX Store soon") as described below.

The DVD drive 17 can read data recorded in recording media such as DVDs and CDs, For example, reproduction of music and video and update of the map information DB 31 are carried out on the basis of the data read by the DVD drive 17.

The communication module 18 is a communication device that receives traffic information including congestion information, restriction information, and traffic accident information transmitted from traffic information centers such as the VICS center and probe centers, and corresponds to a cellular phone and a data communication module (DCM).

Figure 3:
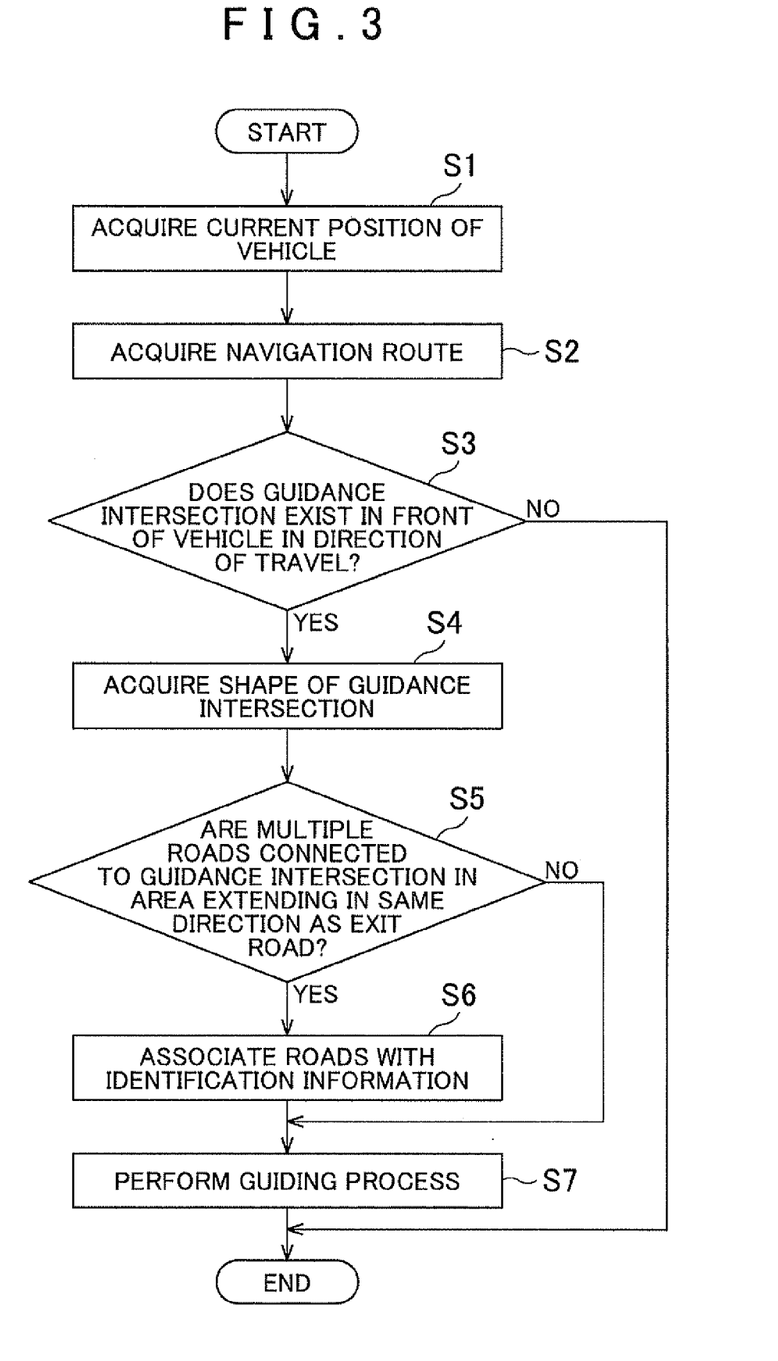
FIG. 3 is a flow chart of an intersection guidance processing algorithm according to the example.

The intersection guidance process will now be described with reference to the algorithm shown in FIG. 3. The process algorithm may be implemented in the form of a computer program that is stored in, for example, the RAM 42 or the ROM 43 included in the navigation system 1, and executed by the CPU 41. Although the structure of the above-described navigation system 1 is referenced in the description of the process, the reference to such structure is exemplary, and the process need not be limited by the specific structure of the navigation system 1.

Herein, the intersection guidance processing program is a program to provide traveling guidance at the guidance intersection, and is executed after the power to accessories (ACC) of the vehicle is turned on.

In Step 1 of the intersection guidance processing program, the CPU 41 acquires the current position of the vehicle from the results detected by the current-position detecting unit 11. In the following description, "Step" is abbreviated as "S." The current-position detecting unit 11 also performs map matching process in which the current position of the vehicle on map data is determined.

In S2, the CPU 41 acquires a navigation route set in the navigation system 1. The navigation route is a recommended route from a place of departure (for example, the current position of the vehicle) to a destination selected by the user, and is set on the basis of the results of the route search process. Route search process is performed on the basis of for example, well-known Dijkstra's algorithm using information such as the link data 32 and the node data 33 stored in the map information DB 31 and traffic information acquired from the VICS center.

In S3, the CPU 41 determines whether or not a guidance intersection exists in front of the vehicle in the direction of travel within a predetermined distance (for example, within one kilometer) on the basis of the current position of the vehicle acquired in S1 and the navigation route acquired in S2. As described above, the guidance intersection refers to an intersection at which the navigation system 1 provides instructions to, for example, turn left or right while the navigation system 1 provides traveling guidance along the navigation route.

If it is determined that a guidance intersection exists in front of the vehicle in the direction of travel within the predetermined distance (Yes in S3), the process proceeds to S4. If it is determined that no guidance intersection exists in front of the vehicle in the direction of travel within the predetermined distance (No in S3), the intersection guidance processing program is ended.

In S4, the CPU 41 acquires the shape of the guidance intersection. The shape of the guidance intersection acquired in S4 includes the number of links connected to the guidance intersection (connected links), connecting directions along which the connected links are connected to the guidance intersection, and following states of the connected links. The CPU 41 acquires the shape of the guidance intersection by reading data such as the link data 32, the node data 33, and the intersection data 34 relating to the guidance intersection from the map information DB 31 in S4.

In S5, the CPU 41 determines whether or not a plurality of roads, for example, at least two roads including an exit road (for which the vehicle leaves the guidance intersection) are connected to the guidance intersection in an area extending in the same direction as the exit road with respect to the direction of an access road (from which the vehicle enters the guidance intersection), that is, determines whether or not a plurality of roads connected to the guidance intersection exist in the area extending in the same direction as the exit road with respect to the direction of the access road on the basis of the navigation route acquired in S2 and the shape of the guidance intersection acquired in S4.

The determination process in S5 will now be described in more detail by referring to specific examples.

In S5, the CPU 41 first determines the access road. Subsequently, the CPU 41 determines whether or not a following road that smoothly follows the access road (hereinafter referred to as "following road") is connected to the guidance intersection.

(A) When No Following Road is Connected to the Guidance Intersection

Figure 4:
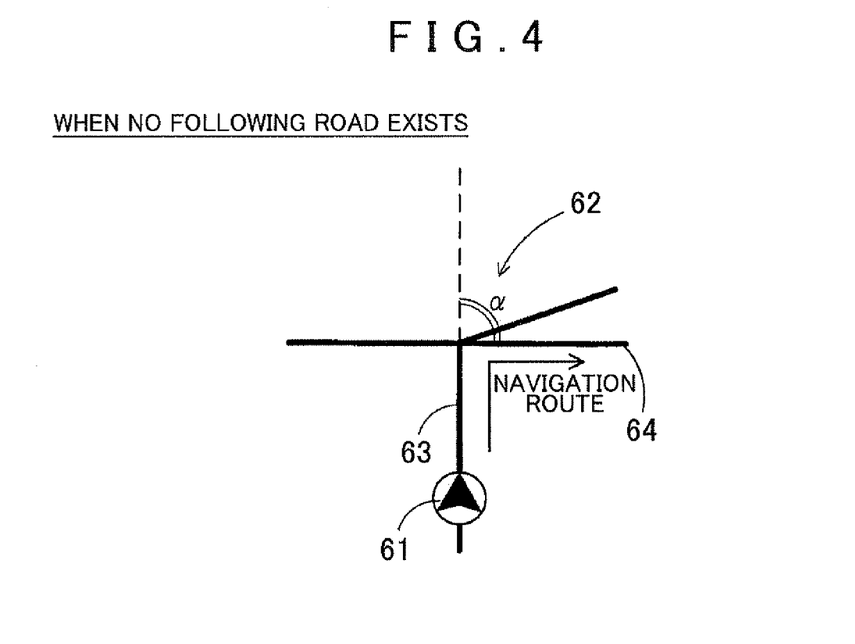
FIG. 4 illustrates a determination process in Step 5 performed when no following road is connected to a guidance intersection.

When no following road is connected to the guidance intersection, the angle of the exit road with respect to the access road is calculated first. As shown in FIG. 4, for example, when a guidance intersection 62 exists in front of a vehicle 61 in the direction of travel, the angle $\alpha$ of an exit road 64 with respect to an access road 63 is calculated.

Figure 5:
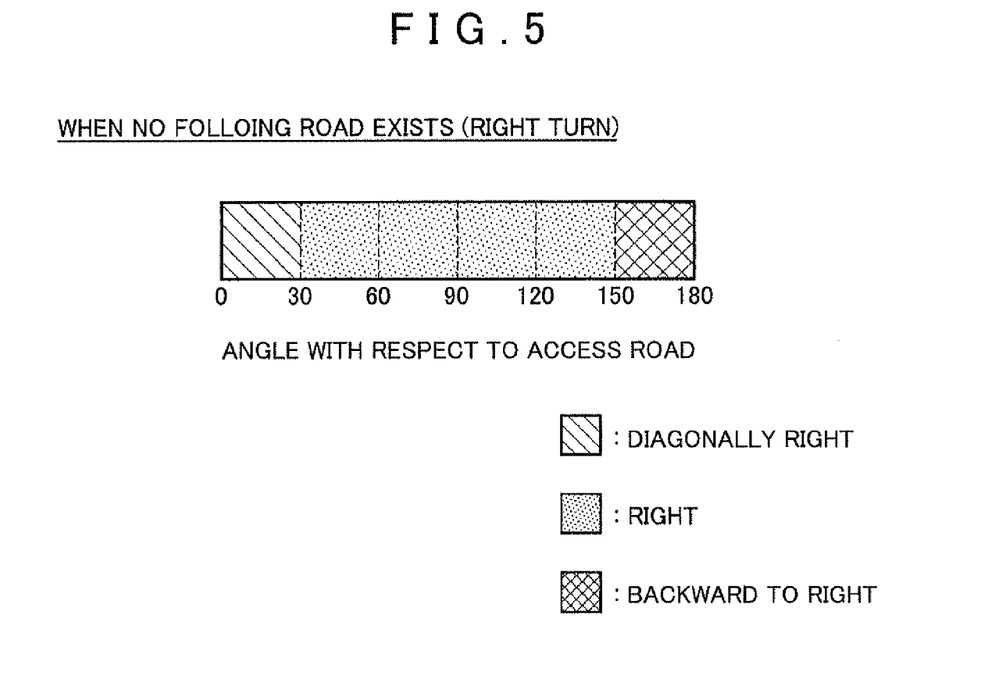
FIG. 5 illustrates angular ranges used when no following road is connected to the guidance intersection.

Next, it is determined which of three angular ranges shown in FIG. 5 the angle of the exit road with respect to the access road is included in. FIG. 5 illustrates angular ranges used when, in particular, guidance for a right turn (that is, when the exit road is located to the right of the access road) is provided at the guidance intersection. The angular ranges are (1) from 0° to less than 30°, (2) from 30° to less than 150°, and (3) from 150° to less than 180°. The numerical values may be changed as appropriate.

Subsequently, the CPU 41 determines whether or not a plurality of (for example, at least two) connecting roads including the exit road exist in the determined angular range (angular range including the angle of the exit road with respect to the access road). If it is determined that a plurality of connecting roads including the exit road exist in the determined angular range, the CPU 41 determines that a plurality of roads including the exit road are connected to the guidance intersection in the area extending in the same direction as the exit road with respect to the direction of the access road in S5.

Figure 6:
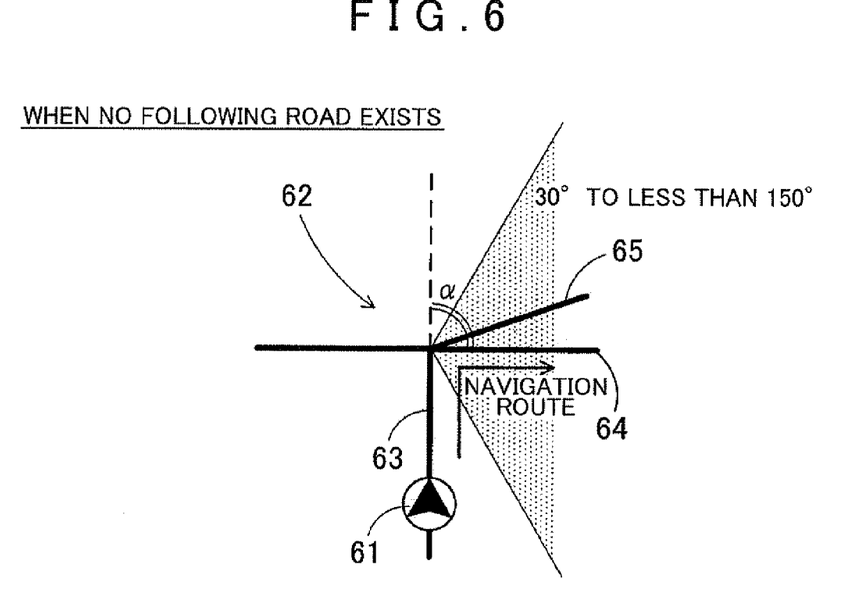
FIG. 6 illustrates a determination process in Step 5 performed when no following road is connected to the guidance intersection.

As shown in FIG. 6, for example, when the angle α of the exit road 64 with respect to the access road 63 is 90°, it is determined whether or not any connecting roads other than the exit road 64 exist in the angular range of 30° to less than 150° with respect to the access road 63. In the example shown in FIG. 6, the CPU 41 determines that a plurality of roads including the exit road are connected to the guidance intersection in the area extending in the same direction as the exit road with respect to the direction of the access road in S5 since a connecting road 65 other than the exit road 64 exists in the angular range of 30° to less than 150° with respect to the access road 63.

The angular ranges shown in FIG. 5 are associated with navigation directions used to provide guidance on the connecting directions of the roads. For example, the angular range (1) from 0° to less than 30° is associated with "diagonally right," the angular range (2) from 30° to less than 150° is associated with "right," and the angular range (3) from 150° to less than 180° is associated with "backward to the right." For example, when the exit road is located to the right of the access road and the angle of the exit road with respect to the access road is in the range of 0° to less than 30°, guidance such as "turn diagonally right soon" is provided in a guiding process described below.

(B) When a Following Road is Connected to the Guidance Intersection

Figure 7:
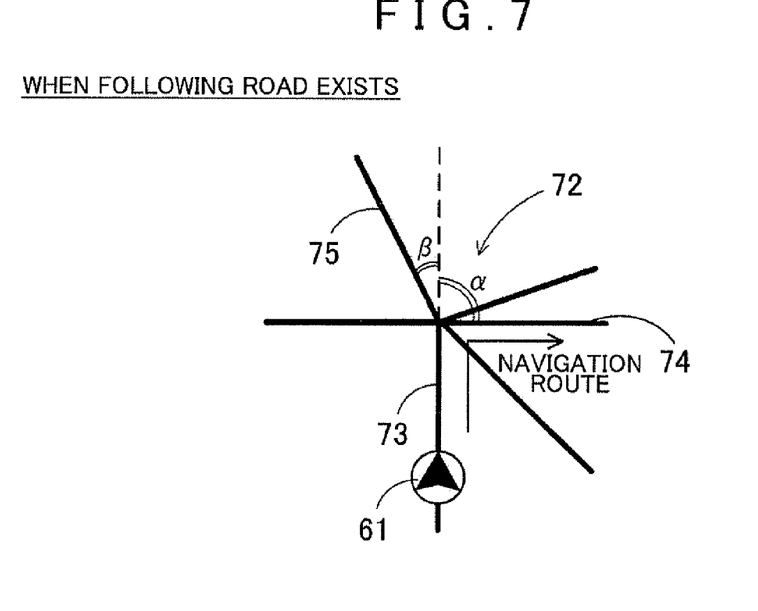
FIG. 7 illustrates a determination process in Step 5 performed when a following road is connected to the guidance intersection.

When the following road is connected to the guidance intersection, the angle of the following road with respect to the access road and the angle of the exit road with respect to the access road are calculated. As shown in FIG. 7, for example, when a guidance intersection 72 exists in front of the vehicle 61 in the direction of travel, the angle α of an exit road 74 with respect to an access road 73, and the angle β of a following road 75 that smoothly follows the access road 73 with respect to the access road 73 are calculated.

Figure 8:
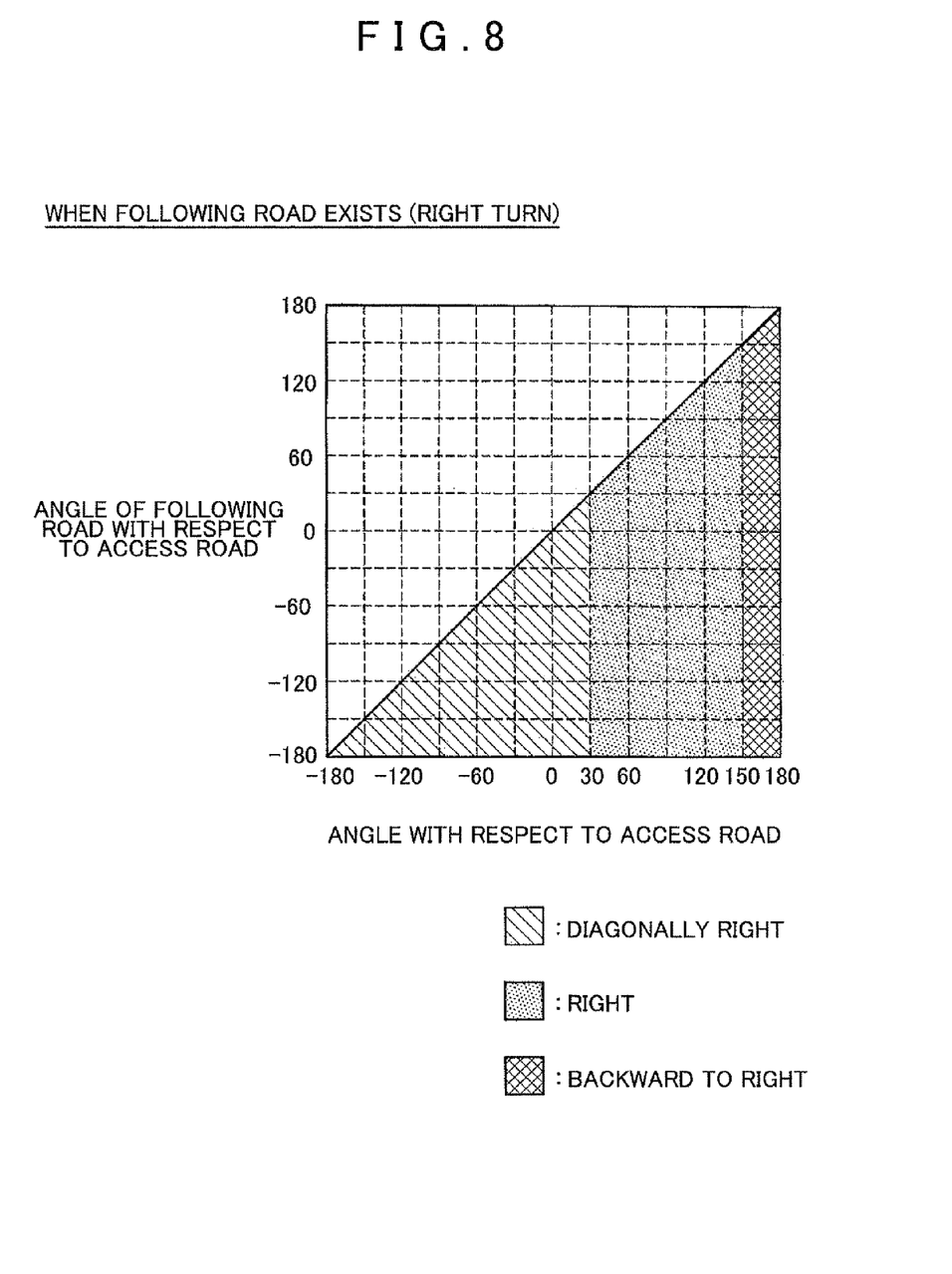
FIG. 8 illustrates angular ranges used when a following road is connected to the guidance intersection.

Next, it is determined which of three angular ranges shown in FIG. 8 the angle of the exit road with respect to the access road is included in. FIG. 8 illustrates angular ranges used when, in particular, guidance for a right turn (that is, when the exit road is located to the right of the access road) is provided at the guidance intersection. The angular ranges are set in accordance with the angle of the following road with respect to the access road. For example, when the angle of the following road with respect to the access road is −30°, the angular ranges are set to (1) from −30° to less than 30°, (2) from 30° to less than 150°, and (3) from 150° to less than 180°. The numerical values may be changed as appropriate.

Subsequently, the CPU 41 determines whether or not a plurality of (for example, at least two) connecting roads including the exit road exist in the determined angular range (angular range including the angle of the exit road with respect to the access road). If it is determined that a plurality of connecting roads including the exit road exist in the determined angular range, the CPU 41 determines that a plurality of roads including the exit road are connected to the guidance intersection in the area extending in the same direction as the exit road with respect to the direction of the access road in S5.

Figure 9:
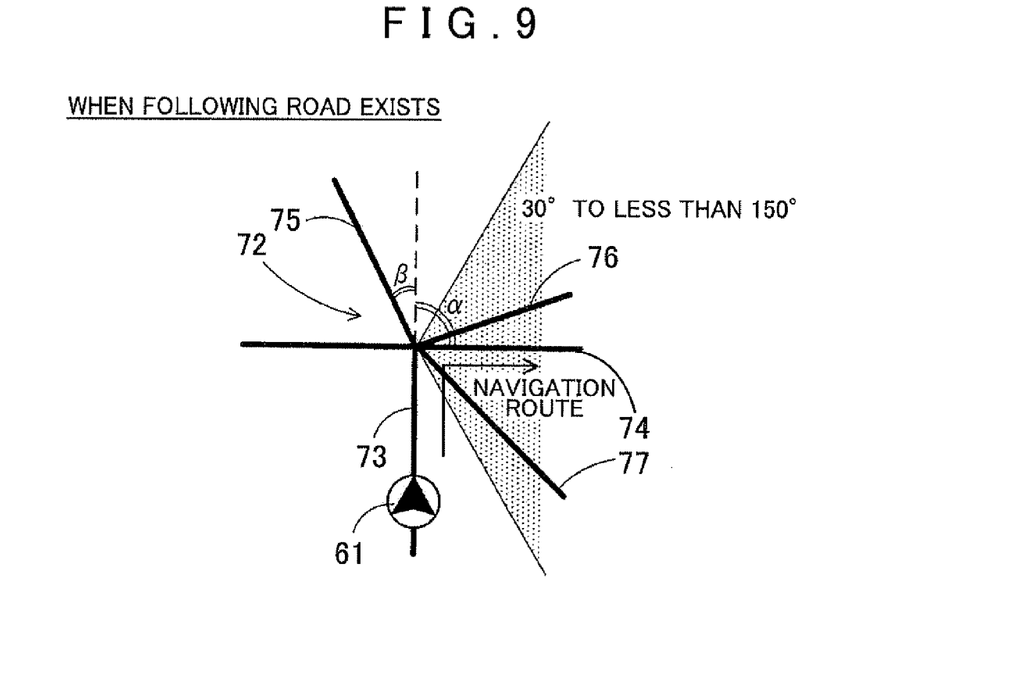
FIG. 9 illustrates a determination process in Step 5 performed when a following road is connected to the guidance intersection.

As shown in FIG. 9, for example, when the angle α of the exit road 74 with respect to the access road 73 is 90° and the angle β of the following road 75 with respect to the access road 73 is −30°, it is determined whether or not any connecting roads other than the exit road 74 exist in the angular range of 30° to less than 150° with respect to the access road 73. In the example shown in FIG. 9, the CPU 41 determines that a plurality of roads including the exit road are connected to the guidance intersection in the area extending in the same direction as the exit road with respect to the direction of the access road in S5 since connecting roads 76 and 77 other than the exit road 74 exist in the angular range of 30° to less than 150° with respect to the access road 73.

The angular ranges shown in FIG. 8 are associated with navigation directions as are the angular ranges shown in FIG. 5.

If it is determined that a plurality of roads including the exit road are connected to the guidance intersection in the area extending in the same direction as the exit road with respect to the direction of the access road in the determination process in S5 (Yes in S5), the process proceeds to S6. If no roads including the exit road are connected to the guidance intersection in the area extending in the same direction as the exit road with respect to the direction of the access road (No in S5), the process proceed to S7 (guiding process).

In the guiding process (S7) performed when it is determined that a plurality of roads including the exit road are not connected to the guidance intersection in the area extending in the same direction as the exit road with respect to the direction of the access road in S5, guidance on the guidance intersection is provided when the vehicle reaches points separated from the guidance intersection by predetermined distances (for example, 300 and 700 meters). Specifically, guidance used to determine the direction of travel of the vehicle at the guidance intersection, that is, guidance used to determine the exit road, is provided. The guidance details are determined on the basis of the navigation direction (see FIGS. 5 and 8) associated with the angular range in which the angle of the exit road with respect to the access road is included. For example, when the exit road is located to the right of the access road and the angle of the exit road with respect to the access road is in the range of 0° to less than 30°, guidance such as "turn diagonally right soon (in 700 meters)" is provided. Furthermore, when the vehicle reaches a point separated from the guidance intersection by a predetermined distance (for example, 300 meters), an enlarged view of the periphery of the guidance intersection and the directions of the vehicle at the guidance intersection are displayed on the liquid crystal display 15. This allows the user to correctly determine the road for which the vehicle leaves the guidance intersection.

Meanwhile, in S6, the CPU 41 associates each road determined as being included in the area extending in the same direction as the exit road with respect to the direction of the access road (hereinafter referred to as "object road") in S5 with an identification information item used to identify the connecting direction along which the object road is connected to the guidance intersection.

The process in S6 will now be described in more detail by referring to specific examples.

In S6, the CPU 41 first determines the access road. Subsequently it is determined whether or not the following road that smoothly follows the access road is connected to the guidance intersection.

Figure 10:
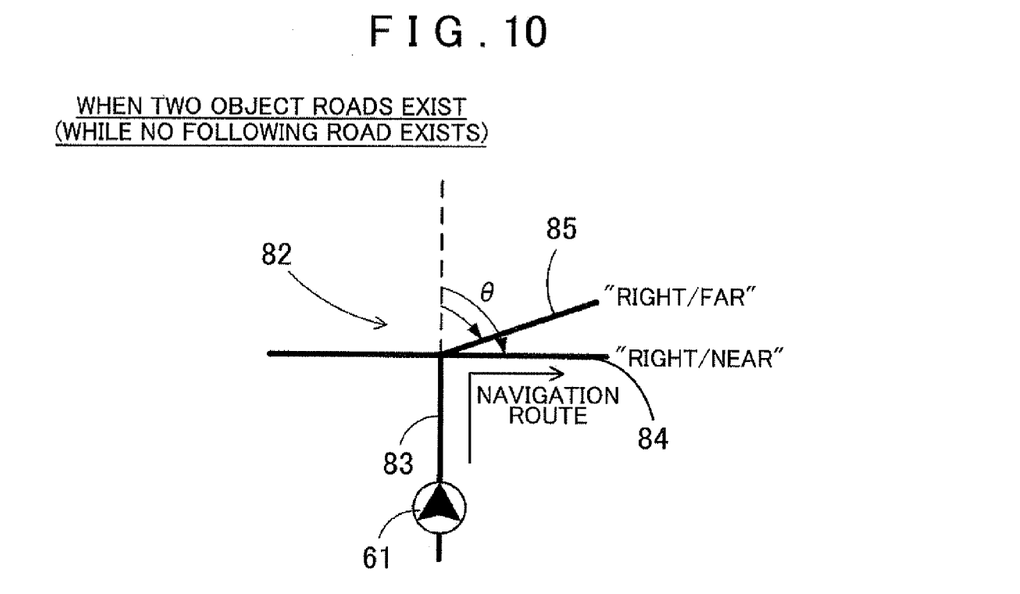
FIG. 10 illustrates a process in Step 6 performed when two object roads exist.

(A) When No Following Road is Connected to the Guidance Intersection:

When no following road is connected to the guidance intersection, each object road is associated with an identification information item on the basis of the positional relationship of the object road with the access road. In FIG. 10, for example, a guidance intersection 82 exists in front of the vehicle 61 in the direction of travel, and is connected to an exit road 84 and a connecting road 85 serving as object roads in an area extending in the same direction as the exit road 84 with respect to the direction of an access road 83. In this case, the connecting road 85 serving as an object road whose angle θ with respect to the access road 83 is the smallest among the object roads is associated with an identification information item indicating a connecting direction of "right/far," and the exit road 84 serving as an object road whose angle θ with respect to the access road 83 is the second smallest is associated with an identification information item indicating a connecting direction of "right/near."

Figure 11:
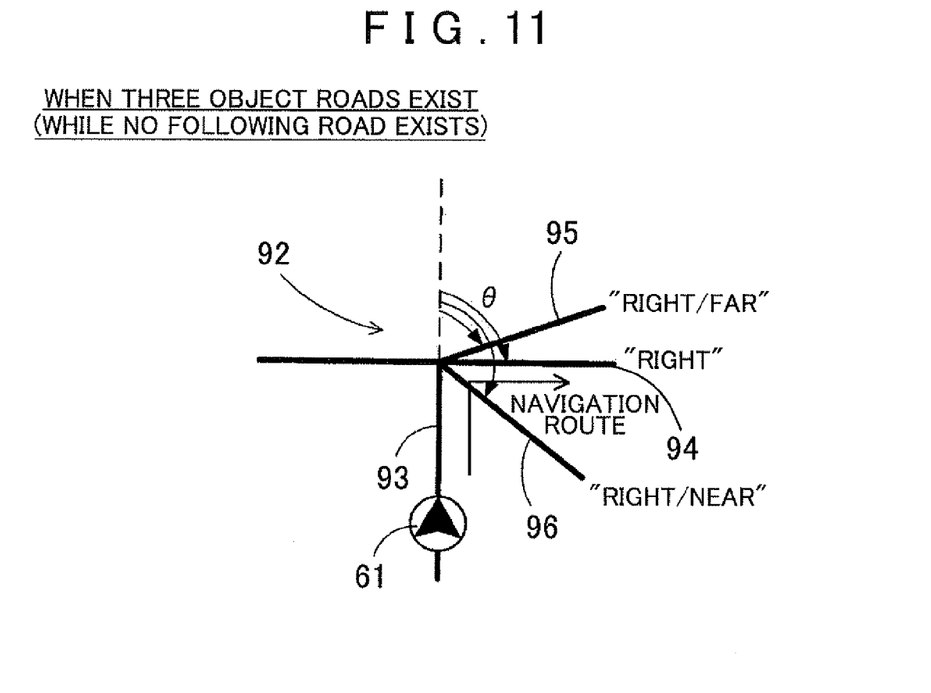
FIG. 11 illustrates a process in Step 6 performed when three object roads exist.

In FIG. 11, for example, a guidance intersection 92 exists in front of the vehicle 61 in the direction of travel, and is connected to an exit road 94 and connecting roads 95 and 96 serving as object roads in an area extending in the same direction as the exit road 94 with respect to the direction of an access road 93. In this case, the connecting road 95 serving as an object road whose angle θ with respect to the access road 93 is the smallest among the object roads is associated with an identification information item indicating a connecting direction of "right/far," the exit road 94 serving as an object road whose angle θ with respect to the access road 93 is the second smallest is associated with an identification information item indicating a connecting direction of "right," and the connecting road 96 serving as an object road whose angle θ with respect to the access road 93 is the largest is associated with an identification information item indicating a connecting direction of "right/near."

This allows relative identification of the object roads on the basis of the identification information item even when a plurality of object roads exist. Similarly, each object road may be associated with an identification information item on the basis of the positional relationship of the object road with the access road even when four or more object roads exist.

(B) When a Following Road is Connected to the Guidance Intersection:

When the following road is connected to the guidance intersection, each object road is associated with an identification information item on the basis of the positional relationship of the object road with the following road. Specifically, the object roads are associated with identification information items such as "right/far" and "right/near" or "right/far," "right," and "right/near" in ascending order of angle of the object roads with respect to the following road. The procedure is similar to that described in the section "(A) When no following road is connected to the guidance intersection" except that the identification information is associated with the object roads using the angles of the object roads with respect to the following road instead of the angles of the object roads with respect to the access road.

When a feature exists at the periphery of the guidance intersection, each object road may be associated with an identification information item on the basis of the positional relationship of the object road with respect to the feature as follows.

Figure 12:
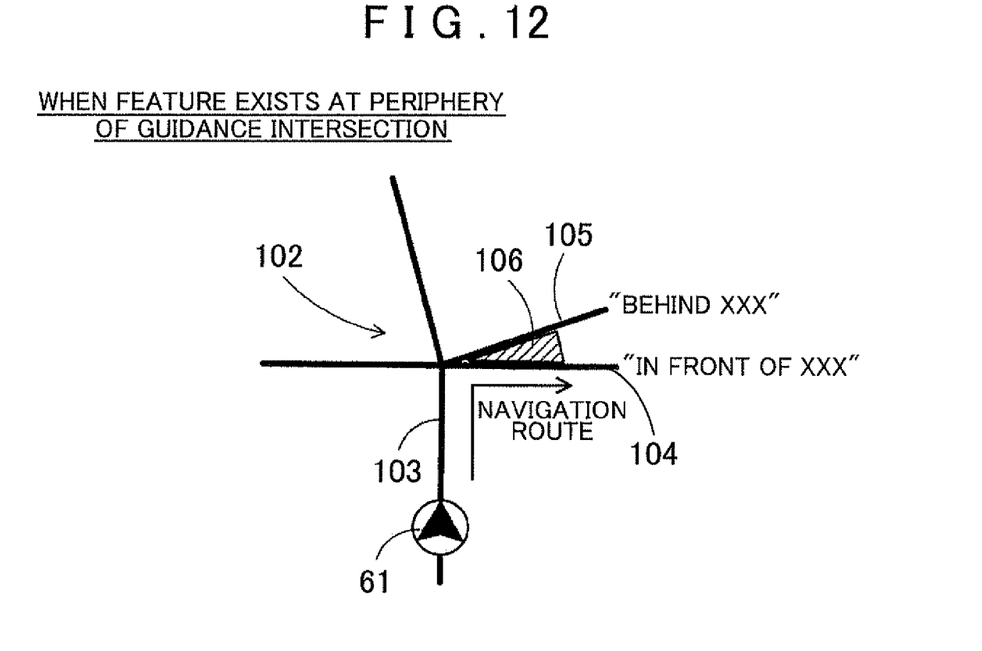
FIG. 12 illustrates a process in Step 6 performed when a feature exists at the periphery of the guidance intersection.

(C) When a Feature Exists at the Periphery of the Guidance Intersection:

In FIG. 12, a guidance intersection 102 existing in front of the vehicle 61 in the direction of travel is connected to an exit road 104 and a connecting road 105 serving as object roads in an area extending in the same direction as the exit road 104 with respect to the direction of an access road 103, and a feature 106 exists between the exit road 104 and the connecting road 105. In this case, the connecting road 105 serving as an object road that is located behind the feature 106 among the object roads is associated with an identification information item indicating a connecting direction of "behind XXX (name of the feature)," and the exit road 104 serving as an object road located in front of the feature 106 is associated with an identification information item indicating a connecting direction of "in front of XXX (name of the feature)."

This allows relative identification of the object roads on the basis of the identification information even when a plurality of object roads exist. Similarly, each object road may be associated with an identification information item on the basis of the positional relationship of the object road with the feature even when three or more object roads exist.

In S7, the CPU 41 provides guidance on the guidance intersection when the vehicle reaches points separated from the guidance intersection by predetermined distances (for example, 300 and 700 meters) on the basis of the identification information items associated with each of the object roads in S6. Specifically, the CPU 41 provides guidance with which the driver can determine the direction of travel of the vehicle at the guidance intersection, that is, guidance with which the driver can determine the exit road is provided using the identification information item associated with the exit road among the object roads. For example, when the exit road is associated with an identification information item of "right/near" as shown in FIG. 10, guidance such as "turn right into the nearest road soon (in 700 meters)" is provided. When the exit road is associated with an identification information item of "right" as shown in FIG. 11, guidance such as "turn right soon (in 700 meters)" is provided. Moreover, when the exit road is associated with an identification information item of "in front of XXX (name of a feature)" as shown in FIG. 12, guidance such as "turn right into a road in front of XXX (name of the feature) soon (in 700 meters)" is provided. Furthermore, when the vehicle reaches a point separated from the guidance intersection by a predetermined distance (for example, 300 meters), an enlarged view of the periphery of the guidance intersection and the directions of the vehicle at the guidance intersection are displayed on the liquid crystal display 15.

This allows the user to correctly determine the road for which the vehicle leaves the guidance intersection.

In accordance with the navigation system 1, the route guidance method using the navigation system 1, and the computer program executed by the navigation system 1 according to this example described above, it is determined whether or not a guidance intersection exists in front of a vehicle in the direction of travel on the basis of the position of the vehicle and a navigation route set in the navigation system 1 (S3). If it is determined that a guidance intersection exists in front of the vehicle in the direction of travel, the shape of the guidance intersection is acquired (S4), and it is determined whether or not a plurality of roads including an exit road for which the vehicle leaves the guidance intersection are connected to the guidance intersection in an area extending in the same direction as the exit road on the basis of the navigation route and the acquired shape of the guidance intersection (S5). If it is determined that a plurality of roads including the exit road are connected to the guidance intersection in the area extending in the same direction as the exit road, each road is associated with an identification information item used to identify a connecting direction along which the road is connected to the guidance intersection (S6), and guidance on the guidance intersection is provided using the identification information item associated with the exit road (S7). Thus, even when a plurality of roads connected to the guidance intersection exist in the area extending in the same direction as the exit road, the user can correctly determine the exit road to which the vehicle is to advance from the guidance intersection. In addition, even when the vehicle has never passed the guidance intersection, the user can correctly determine the exit road without extra operations.

When it is determined that a plurality of roads are connected to the guidance intersection in an area extending in the same direction as the exit road with respect to the direction of an access road from which the vehicle enters the guidance intersection, each road is associated with an identification information item used to identify a connecting direction along which the road is connected to the guidance intersection. Therefore, roads that are not easily identified by the user, in particular, can be associated with the identification information items.

When a following road that smoothly follows the access road is connected to the guidance intersection, each road is associated with an identification information item on the basis of the positional relationship of the road with the following road. Therefore, a plurality of roads existing in an area extending in the same direction as the exit road with respect to the following road can be relatively identified. This allows the user to determine the exit road to which the vehicle is to advance from the guidance intersection more correctly.

When no following road that smoothly follows the access road is connected to the guidance intersection, each road is associated with an identification information item on the basis of the positional relationship of the road with the access road. Therefore, a plurality of roads existing in an area extending in the same direction as the exit road with respect to the access road can be relatively identified. This allows the user to correctly determine the exit road to which the vehicle is to advance from the guidance intersection even when no following road exists.

When a feature exists at the periphery of the guidance intersection, each road is associated with an identification information item on the basis of the positional relationship of the road with the feature. Therefore, a plurality of roads in an area extending in the same direction as the exit road with respect to the feature can be relatively identified. This allows the user to determine the exit road to which the vehicle is to advance from the guidance intersection more correctly.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, when it is determined whether or not a plurality of roads including the exit road are connected to the guidance intersection in the area extending in the same direction as the exit road (for which the vehicle leaves the guidance intersection) with respect to the direction of the access road (from which the vehicle enters the guidance intersection) in S5, a large road such as a national road including up and down (two or more) links connected to the guidance intersection is desirably regarded as one road regardless of the number of links included in the road.

In this example, it is determined whether or not at least two roads including the exit road (for which the vehicle leaves the guidance intersection) are connected to the guidance intersection in the area extending in the same direction as the exit road with respect to the direction of the access road (from which the vehicle enters the guidance intersection) in S5. However, it may be determined whether or not three or more roads or four or more roads are connected to the guidance intersection.

When the angle of the exit road with respect to the access road is less than or equal to a predetermined angle (for example, 15°) and no road whose angle with respect to the access road is less than or equal to a predetermined angle (for example, 25°) is connected to the guidance intersection, the exit road may be associated with an identification information item of "ahead" without performing the processes in S5 and S6.

In this example, when a plurality of roads are included in the same angular range as the exit road among the angular ranges shown in FIGS. 5 and 8 in S5, it is determined that a plurality of roads including the exit road are connected to the guidance intersection in the area extending in the same direction as the exit road with respect to the direction of the access road. However, the determination process in S5 may be performed on the basis of differences in the angle between the roads and the exit road without using the angular ranges shown in FIGS. 5 and 8. In this case, it is determined whether or not a plurality of roads including the exit road are connected to the guidance intersection in an area extending in the same direction as the exit road on the basis of the differences in the angle between the roads and the exit road without using the direction of the access road as the reference. For example, when the exit road includes two or more lanes, it is determined whether or not another connecting road is connected to the guidance intersection in a range of 45° of the exit road. When such a connecting road exists, it is determined that a plurality of roads including the exit road are connected to the guidance intersection in the area extending in the same direction as the exit road, and the process proceeds to S6. When the exit road includes only one lane, it is determined whether or not another connecting road is connected to the guidance intersection in a range of 90° of the exit road. When such a connecting road exists, it is determined that a plurality of roads including the exit road are connected to the guidance intersection in the area extending in the same direction as the exit road, and the process proceeds to S6.

In the above example, the inventive principles are incorporated in the navigation system 1. However, these inventive principles may also be incorporated in, for example, mobile terminals such as cellular phones and personal computers.

What is claimed is:

1. A route guidance apparatus for a moveable body, the apparatus comprising:
   a controller that:
      sets a navigation route;
      acquires a position of the movable body;
      based on the acquired position, determines a guidance intersection in front of the movable body in a direction of travel along the navigation route;
      acquires a shape of the guidance intersection;
      determines an exit road on which the movable body leaves the guidance intersection according to the navigation route;

based on the acquired shape of the guidance intersection, determines whether the determined exit road is one of a plurality of roads connected to the guidance intersection that exist in an area extending in the same direction as the determined exit road;

when the determined road is one of the plurality of roads that exist in the area extending in the same direction as the exit road, associates each of the plurality of roads with an identification information item usable to identify a connecting relationship with the guidance intersection; and provides guidance on the guidance intersection using the identification information item associated with the exit road.

2. The route guidance apparatus according to claim 1, wherein the controller:

determines whether the plurality of roads exist in the area extending in the same direction as the exit road with respect to a direction of an access road from which the movable body enters the guidance intersection.

3. The route guidance apparatus according to claim 1, wherein the controller:

based on the acquired shape of the intersection, determines whether a following road exists that exits the intersection and smoothly follows an access road from which the movable body enters the guidance intersection;

wherein, when the following road exists, the identification information item for each of the plurality of roads describes a positional relationship between the road and the following road.

4. The route guidance apparatus according to claim 3, wherein:

when the following road does not exist, the identification information item for each of the plurality of roads describes a positional relationship between the road and the access road.

5. The route guidance apparatus according to claim 1, wherein the controller:

acquires information about a feature that exists at a periphery of the guidance intersection;

wherein the identification information item for each of at least one of the plurality of roads describes a positional relationship between the road and the feature.

6. A navigation system comprising the route guidance apparatus according to claim 1.

7. A cellular telephone comprising the route guidance apparatus according to claim 1.

8. A route guidance method for a moveable body, the method comprising:

setting a navigation route;

acquiring a position of the movable body;

based on the acquired position, determining, with a processor, a guidance intersection in front of the movable body in a direction of travel along the navigation route;

acquiring a shape of the guidance intersection;

determining, with the processor, an exit road on which the movable body leaves the guidance intersection according to the navigation route;

based on the acquired shape of the guidance intersection, determining, with the processor, whether the determined exit road is one of a plurality of roads connected to the guidance intersection that exist in an area extending in the same direction as the determined exit road;

when the determined road is one of the plurality of roads that exist in the area extending in the same direction as the exit road, associating, with the processor, each of the plurality of roads with an identification information item usable to identify a connecting relationship with the guidance intersection; and providing, with the processor, guidance on the guidance intersection using the identification information item associated with the exit road.

9. The route guidance method according to claim 8, further comprising:

determining, with the processor, whether the plurality of roads exist in the area extending in the same direction as the exit road with respect to a direction of an access road from which the movable body enters the guidance intersection.

10. The route guidance method according to claim 8, further comprising:

based on the acquired shape of the intersection, determining, with the processor, whether a following road exists that exits the intersection and smoothly follows an access road from which the movable body enters the guidance intersection;

wherein, when the following road exists, the identification information item for each of the plurality of roads describes a positional relationship between the road and the following road.

11. The route guidance method according to claim 10, wherein:

when the following road does not exist, the identification information item for each of the plurality of roads describes a positional relationship between the road and the access road.

12. The route guidance method according to claim 8, further comprising:

acquiring information about a feature that exists at a periphery of the guidance intersection;

wherein the identification information item for each of at least one of the plurality of roads describes a positional relationship between the road and the feature.

13. A non-transitory computer-readable storage medium storing a computer-executable route guidance program, the program comprising:

instructions for setting a navigation route;

instructions for acquiring a position of a movable body;

instructions for, based on the acquired position, determining a guidance intersection in front of the movable body in a direction of travel along the navigation route;

instructions for acquiring a shape of the guidance intersection;

instructions for determining an exit road on which the movable body leaves the guidance intersection according to the navigation route;

instructions for, based on the acquired shape of the guidance intersection, determining whether the determined exit road is one of a plurality of roads connected to the guidance intersection that exist in an area extending in the same direction as the determined exit road;

instructions for, when the determined road is one of the plurality of roads that exist in the area extending in the same direction as the exit road, associating each of the plurality of roads with an identification information item usable to identify a connecting relationship with the guidance intersection; and instructions for providing guidance on the guidance intersection using the identification information item associated with the exit road.

14. The storage medium according to claim 13, the program further comprising:

instructions for determining whether the plurality of roads exist in the area extending in the same direction as the exit road with respect to a direction of an access road from which the movable body enters the guidance intersection.

15. The storage medium according to claim 13, the program further comprising:

instructions for, based on the acquired shape of the intersection, determining whether a following road exists that exits the intersection and smoothly follows an access road from which the movable body enters the guidance intersection;

wherein, when the following road exists, the identification information item for each of the plurality of roads describes a positional relationship between the road and the following road.

16. The storage medium according to claim 15, wherein:

when the following road does not exist, the identification information item for each of the plurality of roads describes a positional relationship between the road and the access road.

17. The storage medium according to claim 13, the program further comprising:

instructions for acquiring information about a feature that exists at a periphery of the guidance intersection;

wherein the identification information item for each of at least one of the plurality of roads describes a positional relationship between the road and the feature.

* * * * *